United States Patent [19]

Agrawal et al.

[11] Patent Number: 5,440,849
[45] Date of Patent: * Aug. 15, 1995

[54] VEHICULAR PANEL ASSEMBLY AND METHOD FOR MAKING SAME

[75] Inventors: Raj K. Agrawal; Doug Crank, both of Holland, Mich.

[73] Assignee: Donnelly Corporation, Holland, Mich.

[ * ] Notice: The portion of the term of this patent subsequent to Jul. 26, 2011 has been disclaimed.

[21] Appl. No.: 146,731

[22] Filed: Oct. 29, 1993

Related U.S. Application Data

[63] Continuation of Ser. No. 897,764, Jun. 12, 1992, Pat. No. 5,331,784.

[51] Int. Cl.⁶ .............................................. E04B 1/62
[52] U.S. Cl. ........................................ 52/393; 156/108
[58] Field of Search ..................... 52/746, 396, 403; 156/108, 306.6, 309.6

[56] References Cited

U.S. PATENT DOCUMENTS

| | | |
|---|---|---|
| 3,478,475 | 11/1969 | Strack . |
| 3,574,024 | 4/1971 | Rose ..................... 156/108 |
| 3,837,984 | 9/1974 | Wagner et al. . |
| 3,879,241 | 4/1975 | Butler . |
| 3,916,055 | 10/1975 | Wagner . |
| 4,139,234 | 2/1979 | Morgan . |
| 4,167,259 | 9/1979 | Bury . |
| 4,247,510 | 1/1981 | Desverchere . |
| 4,364,214 | 12/1982 | Morgan et al. . |
| 4,571,278 | 2/1986 | Kunert . |
| 4,606,159 | 8/1986 | Kunert . |
| 4,625,459 | 12/1986 | Warner . |
| 4,635,415 | 1/1987 | Schumacher et al. . |
| 4,681,794 | 7/1987 | Kunert et al. . |
| 4,777,699 | 10/1988 | Hill et al. . |
| 4,799,344 | 1/1989 | Francis . |
| 4,879,853 | 11/1989 | Braendle et al. . |
| 4,910,071 | 3/1990 | Kunert . |
| 4,932,712 | 6/1990 | Tomforde . |
| 4,933,032 | 6/1990 | Kunert . |
| 4,938,521 | 7/1990 | Kunert . |
| 4,994,315 | 2/1991 | Schreiber et al. . |
| 5,057,265 | 10/1991 | Kunert et al. . |
| 5,057,354 | 10/1991 | Kunert et al. . |
| 5,061,429 | 10/1991 | Yoshihara et al. . |
| 5,062,248 | 11/1991 | Kunert . |
| 5,064,494 | 11/1991 | Duck et al. . |

FOREIGN PATENT DOCUMENTS 451507  8/1936  United Kingdom .

OTHER PUBLICATIONS

Article entitled "Application of RIM Urethane to One Side of Glass for Automotive Windows," by Louis R. Csokasy and Peter J. Kubizne, Excel Industries, Inc., Feb. 25, 1991.

Case Study entitled "An Encapsulated Window Program Between a U.S. Supplier and a Japanese Automobile Company," by Louis R. Csokasy and Gregor J. Jager, Excel Industries, Inc., Feb. 26, 1990.

*Primary Examiner*—Carl D. Friedman
*Assistant Examiner*—Creighton Smith
*Attorney, Agent, or Firm*—Price, Heneveld, Cooper, DeWitt & Litton

[57] ABSTRACT

A panel assembly and method of manufacturing the panel assembly, especially adjusted for use in vehicle panels, include locating a preformed gasket in a support fixture in a predetermined pattern to be bonded to a sheet-like panel. The gasket is formed from a polymeric material separately from the panel. The panel is of appropriate size and geometry to fit within a desired vehicle opening. At least one panel surface to receive the gasket is prepared by being primed with a bonding reagent. The panel and primer may be preheated before receiving the gasket to drive off remaining carriers/solvents and improve the bonding process. The panel and preset gasket are pressed together such that the securing flange is in intimate contact with the panel. Locator pins may be used to properly position the panel with respect to the gasket. Once located, heat and pressure are applied, preferably substantially simultaneously, the heat being applied from a side opposite the primed surface, preferably by focused or tuned infrared irradiation.

52 Claims, 6 Drawing Sheets

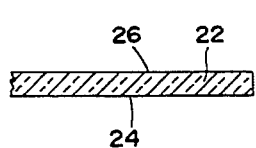
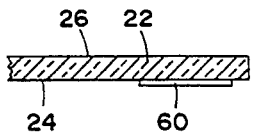
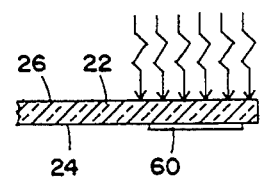
FIG. 3a　　　　　　FIG. 3b　　　　　　FIG. 3c
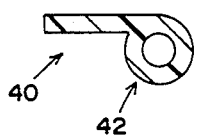
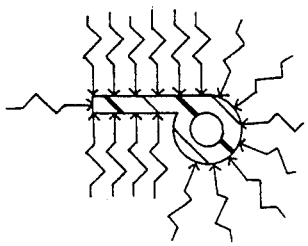
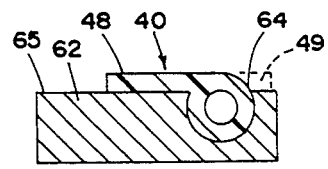
FIG. 3d　　　　　　FIG. 3e　　　　　　FIG. 3f
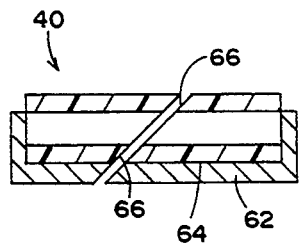
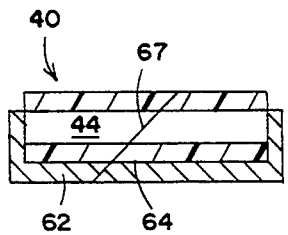
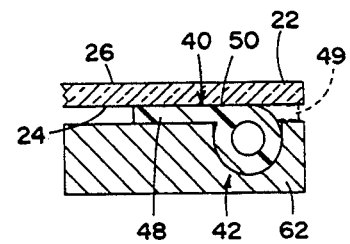
FIG. 3g　　　　　　FIG. 3h　　　　　　FIG. 3i
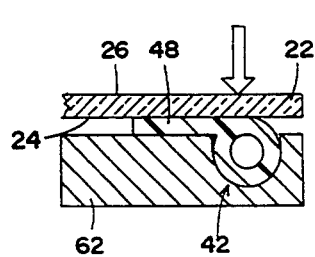
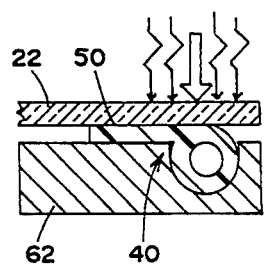
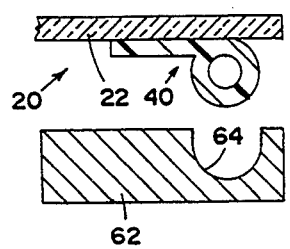
FIG. 3j　　　　　　FIG. 3k　　　　　　FIG. 3L

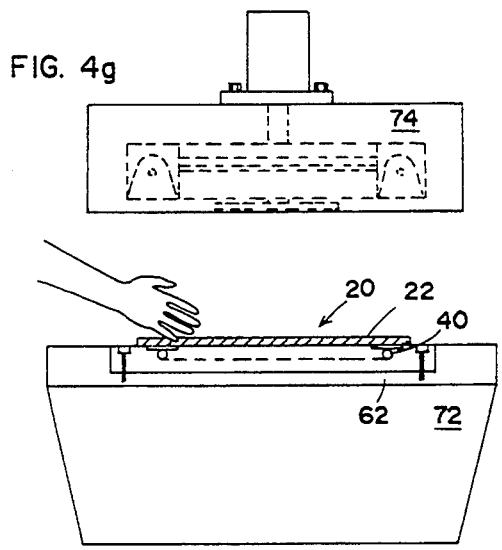
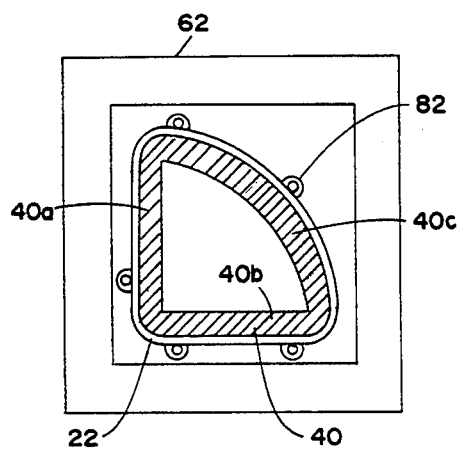
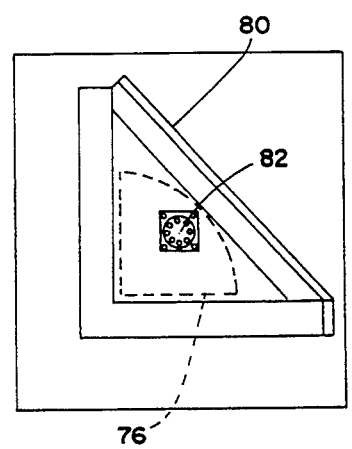
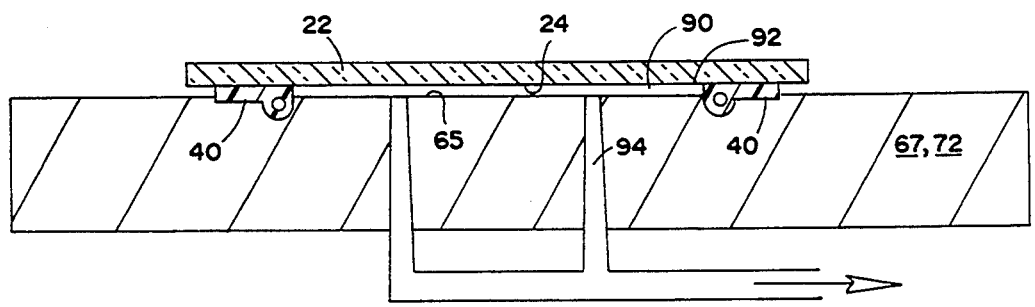

VEHICULAR PANEL ASSEMBLY AND METHOD FOR MAKING SAME

This is a continuation of application Ser. No. 07/897,764 filed Jun. 12, 1992 now U.S. Pat. No. 5,331,784.

BACKGROUND OF THE INVENTION

This invention relates to panel assemblies especially adapted for use as windows in vehicles, buildings or other structures, as well as a method for manufacturing such panel assemblies.

Relatively recent in the history of vehicle panel assemblies, gaskets have been molded or extruded directly onto the window panel. In molded window panels, a sheet of glass is closed within a molding tool and a polymeric material is then injected around the opposing surfaces of the peripheral edge, thereby capturing the peripheral edge of the glass panel within the injected polymeric gasket. After the gasket is cured or hardened, the mold is opened and the panel assembly is removed. To retain the molded panel assembly within the vehicle, studs or clips may be molded within the gasket and used to engage the pinch weld flange forming the vehicle opening. Alternately, or in addition, a bead of adhesive is also often applied to bond the glass panel and gasket directly to the pinch weld flange. A decorative bezel may be molded with the gasket to conceal space between the vehicle and the window assembly. A disadvantage with molding gaskets directly onto the glass panel is the not infrequent breakage of the glass panel during the molding process. Glass panels are not perfectly uniform and are occasionally crushed when the molding tool is closed about the panel.

New styling requirements are calling for flush mounted glass panels having an exposed edge. One flush mounted vehicle panel assembly on the market includes extruded gaskets deposited directly on one surface of a glass sheet. Often the extrusion includes two adhesive beads of polyurethene compounds, one deposited by the panel assembly manufacturer and the other applied by the vehicle assembler. Disadvantages associated with extruded gaskets include long cure time for the first bead, adding cycle time to manufacturing, and constant cross-sectional profiles. In addition to being limited to uniform cross-sectional profiles, the gasket material used in forming extruded gaskets is typically not UV stable by itself and can degrade over time. Moreover, the extrusion does not easily adapt itself to receive mounting studs or clips. The extrusion compound is expensive and requires special storage and handling once formed and cannot be fully completed without creating a seam or gap in the gasket layout.

Another window assembly intended for use in flush mounted applications had a gasket molded directly to a single surface in a molding machine using reaction injection molded (RIM) urethane. Although this technique offered some variable cross sections, the presence of the glass and tooling limitations prevented or precluded gaskets having undercuts or lips. Other disadvantages include instability when subjected to prolonged exposures of ultraviolet light, long cycle times in forming, and increased material costs compared with other materials such as PVC. In addition, tensile or shear forces applied between the glass and gasket result in failure of the adhesive seal of the gasket with the panel as opposed to the desired loss of cohesion in the gasket itself.

None of the prior panel assemblies or methods are as versatile in providing flush mounted panel gaskets having unique cross-sectional profiles, with or without attaching or otherwise capturing fasteners. Moreover, none of the prior methods or panel assemblies can provide flush mounted panel gaskets having cross-sectional profiles which are variable along the panel assembly and satisfy complex sealing requirements.

SUMMARY OF THE INVENTION

The present invention includes a unique panel assembly, especially for vehicles, and method for manufacturing the panel assembly.

The method of this invention is preferred in the manufacture of a panel assembly especially suited for use in vehicles. More particularly, the method is used to manufacture window panel assemblies for vehicles wherein the glass panel is flush-mounted within the vehicle opening and sealed therein by one or more gaskets or grommets bonded to a single surface of the panel. Moreover, the method includes adhering a polymeric gasket or grommet to a single surface of a vehicle panel so that the panel may be mounted flush with the vehicle exterior. The method includes the steps of preparing a surface area of the panel adapted to receive the gasket using a material specially adapted to bond the panel with the gasket. The desired gasket profile is formed from a polymeric material separately from the glass panel. The desired gasket is then located with respect to the panel and heat and pressure are applied to the contact boundary to establish the bond.

In one embodiment of the method, the panel and gasket are preheated. Heat is applied to the panel to improve adhesion to the gasket. The gasket is heated to make it more pliable and promote adhesion. The preheated panel is positioned on the gasket and pressed into intimate contact.

In another form of the method, the panel assembly, especially adapted for use in vehicle windows, includes the steps of priming a surface of the panel adapted to receive the gasket, using a material especially adapted to prepare the panel surface to bond with the gasket and allowed to dry. Drying time may be decreased by preheating the panel to drive off any carriers/solvents in the primer coating and to elevate the energy level of the bonding agents. Preheating of the panel may be reduced or eliminated by applying the primer to the gasket surface. Moreover, if preheating is desired, heat may be applied to the panel. Additional heat may also be applied to the interface between the panel and gasket when the panel is forced against the gasket. The additional heat is preferably directed upon a frit layer between the panel and the gasket to further the bonding process.

The panel assembly of this invention is formed according to the method outlined above and includes a sheet-like panel of predetermined size and geometry. The panel has two surfaces terminating in a peripheral edge, one of which may have a cosmetic ceramic frit coating to conceal the vehicle opening and the manner in which it is attached to the vehicle. A primer coating is applied to the panel surface adapted to receive the gasket and is applied to a restricted area proximate the peripheral edge. The gasket is formed separately from the panel and bonded to the primed surface by the application of heat and pressure. A securing flange or surface of the gasket defines a bonding surface adapted to engage the panel and which may retain mounting hardware to retain the panel in the vehicle. The resulting product made according to the method is a sheet-like panel having a gasket securely attached to at least a portion of at least one surface of the panel and installed as a unit securely within the opening from the exterior.

The panel assemblies and the method of manufacturing them have advantages over the prior art in that the gasket may be mass produced separate from the panel using conventional extrusion or molding techniques. Moreover, the assembly may be accomplished without complex machines to fix the gasket to the panel. Moreover, because bonding the gasket to the panel requires lower pressures than direct molding techniques, fewer panels are broken during the manufacturing process and less waste results. Yet another advantage of the panel assembly and the method of making it is the ability to install the panel assembly in existing vehicles with specific gasket designs for sealing the panel assembly in the vehicle.

These and other objects, advantages, purposes and features of the invention will become more apparent from a study of the following description taken in conjunction with the drawings described below.

BRIEF DESCRIPTION OF THE DRAWINGS

FIGS. 3A-3L schematically illustrate one embodiment of the method and panel assembly;

FIGS. 4A-4G illustrate one embodiment of a machine used to carry out the method;

FIGS. 5 and 6 are two plan views of machine components shown in FIG. 4;

FIGS. 7 illustrates an alternate technique used the method of this invention;

DETAILED DESCRIPTION OF THE PREFERRED EMBODIMENTS

In the following description, reference will be made to "gaskets" and "grommets," and will be used interchangeably herein to refer to strip, elongated or string-like seals, as well as complete loop seals, extruded and molded, and adapted to be placed between two or more surfaces. Although the following description will be made primarily with reference to a gasket made from extruded materials, this is not to be construed as a limitation but is provided merely by way of illustration. The method and panel assembly produced according to the method may also be accomplished using gaskets preformed using injection molding techniques, of which specific examples are described in detail below.

Figure 1:
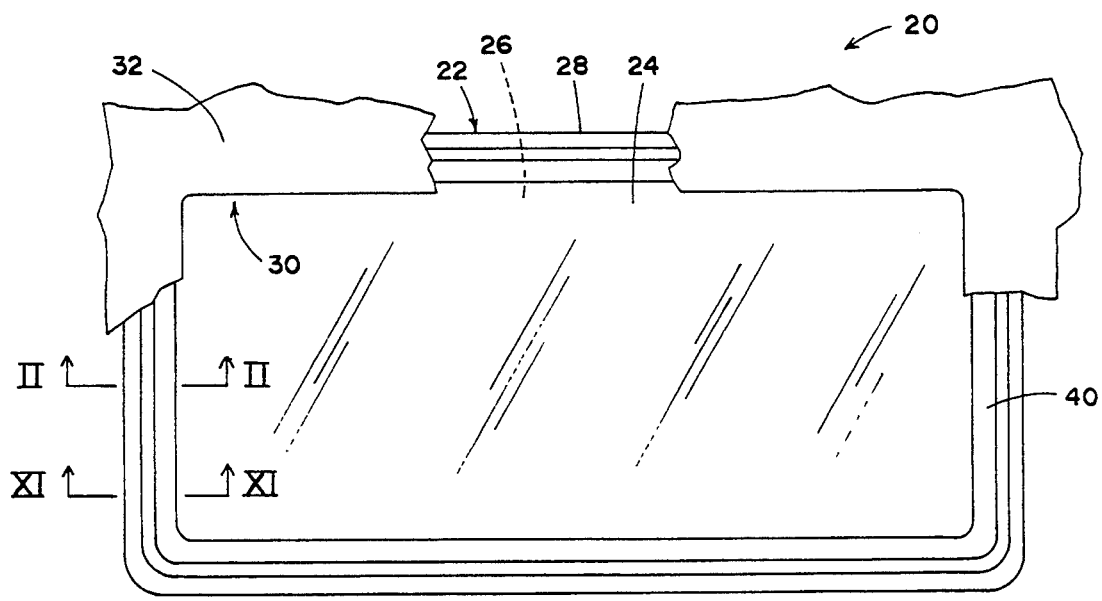
FIG. 1 is a fragmentary plan view of a generic panel assembly of this invention.
Figure 2A:
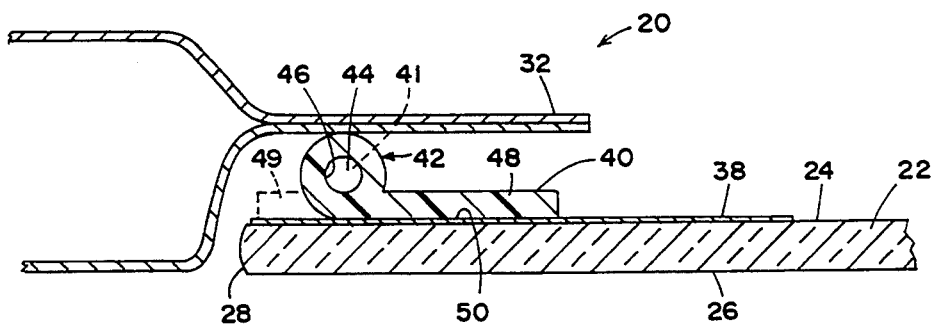
FIGS. 2A and 2B are fragmentary, cross-sectional views taken along line II—II of FIG. 1.

Referring now to the drawing figures in greater detail, FIGS. 1 and 2A illustrate one embodiment 20 of the window panel assembly of the present invention specifically adapted for use in a vehicle as a window and includes a panel or sheet of glass 22 which may be tempered, laminated, or otherwise strengthened using conventional techniques. Sheet 22 has two substantially parallel sides or faces 24, 26 which terminate in a peripheral edge 28. Although a transparent sheet of glass is preferred, other panel materials such as opaque tinted glass, or transparent, tinted, or opaque plastic materials, or multi-composite laminates such as glass and plastic could also be used. Panel assembly 20 is of a particular size and geometry adapted to fit within and conform to a window opening 30 formed by sheet metal pinch flange 32 of the vehicle body.

Fixed to inner surface 24, and extending along and around at least a portion of sheet 22 proximate peripheral edge 28, is a flexible, resilient gasket or grommet 40 intended to provide a weather seal with a portion of a vehicle body when assembly 20 is installed. In FIG. 1, gasket 40 is shown to extend around the entire perimeter of surface 24, disposed between sheet metal pinch flange 32 and sheet 22. Gasket 40 may be fixed to a ceramic frit layer 38 (FIG. 2A) applied and bonded to a restricted area on surface 24 proximate peripheral edge 28 to cosmetically conceal gasket 40 and pinch weld flange 32. Alternately, gasket 40 may be fixed directly to surface 24 of sheet 22 if frit layer 38 is not used.

Gasket 40 is preferably resistant to ultraviolet radiation and preformed using conventional extruding or molding techniques from an elastomeric material, such as polyvinyl chloride (PVC) or RIM urethanes. Other materials may also be used to form gasket 40 so long as the material is compliant and compatible with adhesives used to bond panel 22 in the opening. According to one embodiment, gasket 40 may be extruded as a substantially continuous, elongated, strip, string or strand. For example, one possible extruded cross section of gasket 40, as seen in FIG. 2A, includes a substantially tubular body 42 having a concentric inner chamber 44 formed by inner wall 46. At least one securing flange 48 extends from tubular body 42 so that a bonding surface 50 is tangent to the exterior surface of tubular body 42. A second securing flange 49 may extend from the opposite side up tubular body 42 co-planar with securing flange 48. The bonding surface of flange 49 may also be tangential to tubular body 42. The width and thicknesses of securing flanges 48, 49 may vary depending upon the desired bonding area and particular application. It is anticipated that a width of several centimeters will be suitable for most vehicular window applications, while the size and thickness of tubular body 42 will vary depending upon the sealing force necessary in the vehicle after installation along a given portion of the gasket.

Figure 2B:
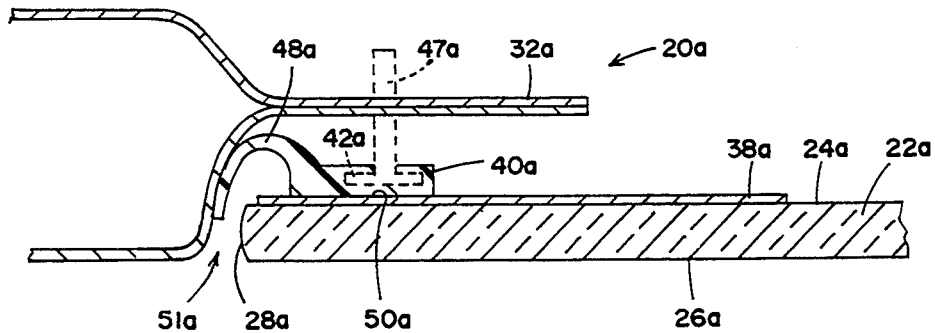

One of the many possible cross sections of molded gasket 40a, shown in FIG. 2B, includes a generally rectangular body 42a which has one surface 50a adapted to be adhered to surface 24a of sheet 22a having frit layer 38a. If desired, rectangular body 42a may be molded about and retain mounting hardware 47a such as locating or mounting studs, clips, and the like, and adapted to retain panel assembly 20a in the vehicle opening. Gasket 40a may also include a lip 48a which extends from rectangular body 42a and bridge or otherwise close gap 51a between panel peripheral edge 28a and the vehicle body. As in the embodiment shown in FIG. 2A and described above, the width of rectangular body 42a and the thickness of lip 48a may vary depending upon the desired bonding area and particular application. Gasket 40a may be molded using conventional molding techniques such as injection molding, blow molding, pour molding, and the like. Advantages provided by molded gaskets include the forming of a continuous gasket with variable cross section suited for specific applications and the encapsulation of mounting studs, clips, and the like, retain the panel in the opening.

Referring now to FIGS. 3A–3L, one method of making panel assembly 20 includes obtaining a panel such as previously cut and shaped transparent sheet-like panel 22 having the desired size and geometry adapted to fit within vehicle opening 30 (FIG. 1). Sheet 22 may have one or more peripheral areas of surfaces 24, 26 cleaned with a solvent such as methylethylketone to remove oils, dirt or other debris which may interfere with the bonding process. After the optional cleaning, at least one coating of primer material 60 is applied to one or both of surfaces 24 or 26, or to frit layer 38 (FIG. 2A), to prepare the panel or frit surface to receive gasket 40. The primer is selected to enhance the adhesion/bond between gasket 40 and sheet surface areas 24, 26 or frit layer 38 and may be any of several varieties depending on the material of gasket 40 and sheet 22, such as heat and/or pressure activated compositions. The primer may be applied by brush, pad, roller or spray and allowed to wholly or partially dry to obtain a substantially uniform, even coating to the sheet surface. For panels having the ceramic frit layer, the primer may be applied directly thereto to achieve substantially the same results for preparing the surface for bonding. If gasket 40 is made from a polyvinyl chloride material, a preferred primer is sold under the designation A-1100-B combined with an adhesion promoter designated A-1167-B, both produced by B. F. Goodrich Co. of Akron, Ohio.

Generally simultaneously with the preparation of sheet 22, gasket 40 (FIG. 3F) is loaded in a fixture 62 having a channel 64 corresponding in shape to the exterior surface of body 42 and adapted to retain gasket 40. The bonding surfaces of gasket 40 adapted to be adhered to panel 22 extend above upper surface 65 of fixture 62 in order to make contact with sheet 22. Channel 64 is in a pattern corresponding to the pattern gasket 40 to be attached to sheet 22. The gasket pattern may be a complete or continuous loop outlining the sheet periphery, a straight or curved shape partially outlining the sheet periphery, or numerous other shapes or patterns adapted to match the requirements for the particular vehicle window opening.

If the pattern of gasket 40 is such that it forms a loop, and the gasket material is in the form of an extruded strip, ends 66 may be trimmed at matching angles (FIG. 3G) using a hot wire or similar technique. After the trimming of the gasket ends, the hot ends may be joined to form seam 67 (FIG. 3H). On the other hand, if the gasket pattern is other than a continuous loop, the extruded strip need only be laid in the fixture pattern, terminating the ends in an appropriate manner. In the case of the tubular gasket shown in FIG. 2A, the joining of gasket ends 66 may hermetically seal inner chamber 44, trapping a volume of gas therein, thus rendering gasket 40 quite resilient. If the ends are not joined, each end 66 may be pinched closed in order to achieve the same results. In another embodiment, the gasket may be extruded and preformed to a specific shape by a secondary operation having the ends joined prior to being located in fixture 65. In either case, extruded gasket 40 may include one or more perforations or vents (not shown) extending through body 42 and joining chamber 44, thus making gasket 40 more compliant. Gasket 40, in such case, retains its cubular shape based upon the inherent memory of the material from which it Is made. Moreover, although gasket 40 is shown to have securing flanges 48, 49 and body 42 having substantially the same thickness, it may be made such that walls of body 42 have a different or gradational thickness about its circumference, or that securing flanges 48, 49 are of different thickness or width. In addition, gasket 40 may include locating pins, mounting studs of clips, or other hardware accessories fixed therein, depending upon the desired application.

If gasket 40 is formed from molded material, some of the same principles described above may apply, depending upon the desired shape. For example, if gasket 40 is molded in a strip and is to be joined to form a loop, the ends may be joined, as described above. However, it is preferred that gasket 40 be molded in the desired shape to be attached to the panel. In this manner, the extra step of mending or welding together of the ends of the gasket material to complete the loop is removed. If a molded gasket 40 is to be placed around only a portion of panel 22, it may be molded to that particular shape, or a section of a looped gasket may be removed to obtain the desired configuration. The benefits of molding gasket 40 include encapsulation of mounting hardware such as location studs, mounting studs or clips, and the like, within the gasket material. Another advantage is that the corners and bends are preshaped and need little if no stretching to fit in fixture 62.

After forming gasket 40 using one of the two extrusion methods or by molding, and locating gasket 40 in fixture 62 so as to expose the bonding surface 50, gasket 40 is ready to be adhered to sheet 22. With reference again to the example of extruded gasket 40, shown in FIGS. 3A–3L, prepared sheet 22 is located on gasket 40 such that primed surface 24 engages bonding surface(s) 50 of securing flange 48, 49 and tubular body 42 (FIG. 3I). Sheet 22 is properly located with gasket 40 by sheet locater pins 82 (FIG. 5) extending substantially perpendicular from fixture 62. The sheet is then pressed into intimate contact with bonding surface 50 (FIG. 3J). Locater pins 82 are situated to engage peripheral edge 28 of sheet 22 so that sheet 22 may nest therein in only one particular configuration. The force used to press sheet 22 against gasket 40 may range between 7 and 100 pounds per square inch (psi), depending upon the width of bonding surface 50, the length of gasket 40 to be fixed to sheet 22, the temperature of gasket 40 and/or sheet 22, the nature of the adhesive and gasket material, and the geometry of sheet 22. For the latter characteristic, the amount of force may vary along sheet 22 for complex sheet geometries.

Generally simultaneously with the application of the pressure, heat energy is applied to the interface between sheet 22 and gasket 40 by heating frit layer 38 (FIG. 2A) between sheet 22 and bonding surface 50 of gasket 40 to between 100° and 350° F. (FIG. 3K). It is preferred that both pressure and heat be applied for between three and thirty seconds in order that heating of frit layer 38 activate primer 60 to bond gasket surface 50 with frit layer 38 and/or panel 22, providing a secure adhesion of gasket 40 to sheet 22. Following the application of pressure and heat for the prescribed period of time, the finished panel assembly 20 is allowed to cool before being moved from fixture 62 (FIG. 3L).

The above method may be carried out with a fixture 62 retained within an apparatus 70, such as shown in FIGS. 4A–4G. Device 70 may include a platen 72, spaced directly opposite an assembly 74, housing an extensible foot 76 and a heat energy source 80 Both foot 76 and source 80 may be moved with respect to platen 72. Fixture 62 and platen 52 may include a heat source (not shown) to preheat gasket 40 to at least 100 degrees Fahrenheit (°F.) once loaded-therein. Several techniques may be used to hold gasket 40 in fixture 62, such as undercuts in the gasket channel, and/or projections defined along the flexible, resilient gasket which are then adapted to snap into corresponding recesses in the fixture. Alternatively, a vacuum may be used to retain the gasket. It should be understood that platen 72 may be adapted to receive many different fixtures 62, each having one or more channel patterns to retain gasket 40. Each fixture may be readily removed and replaced with another, depending upon the desired application. For example, as seen in FIG. 5, fixture 62 retains gasket 40 wherein two legs 40a and 40b form a right angle. A third leg 40c interconnects legs 40a, 40b, forming an arcuate hypotenuse.

Figure 4A:
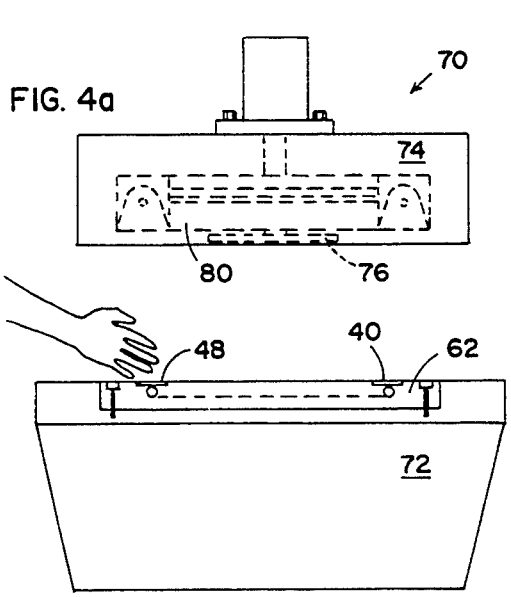
Figure 4B:
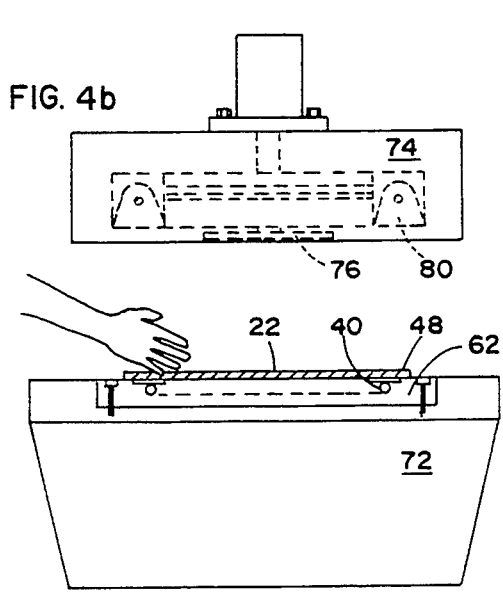
Figure 4C:
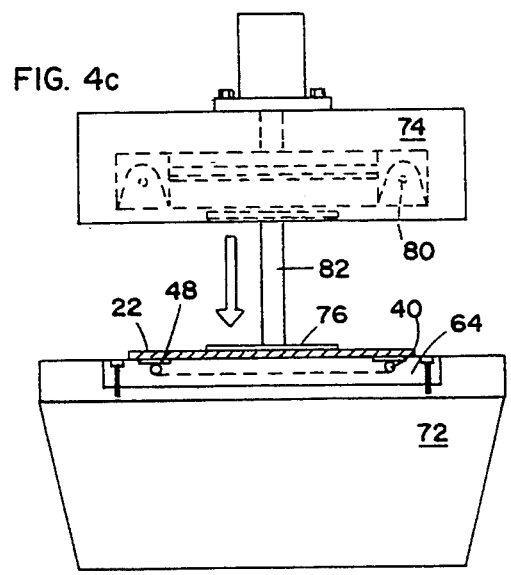
Figure 4D:
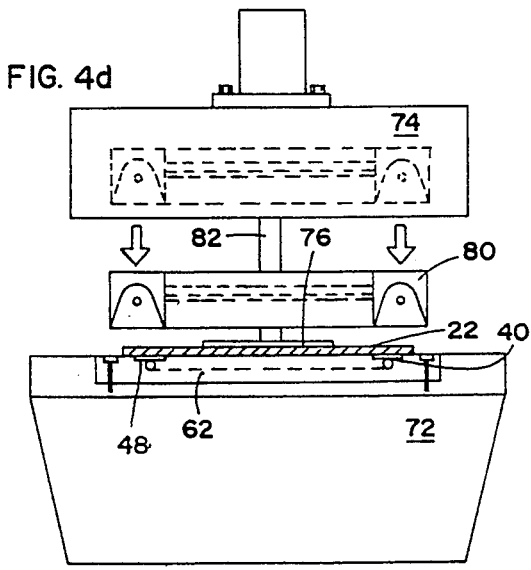
Figure 4E:
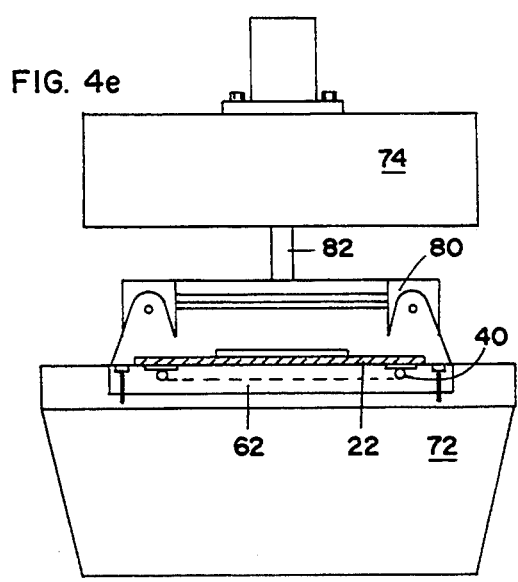
Figure 4F:
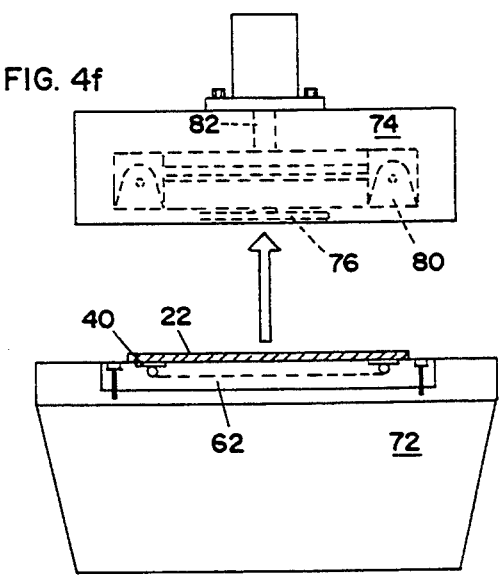

With sheet 22 located on gasket 40, sheet 22 is urged against securing flange 48. This may be accomplished mechanically by foot 76 disposed at the end of a ram 82 integral with assembly 74 (FIG. 4C). Foot 76 is adapted to engage sheet 22, having a plan form to fit within locator pins 82 and inboard of the gasket outline. It is preferred that foot 76 not conceal gasket 40 when engaging sheet 22, but extend only to the inside edge of the outline to apply a pressure between 7 and 100 psi opposite gasket 40.

Figure 8:
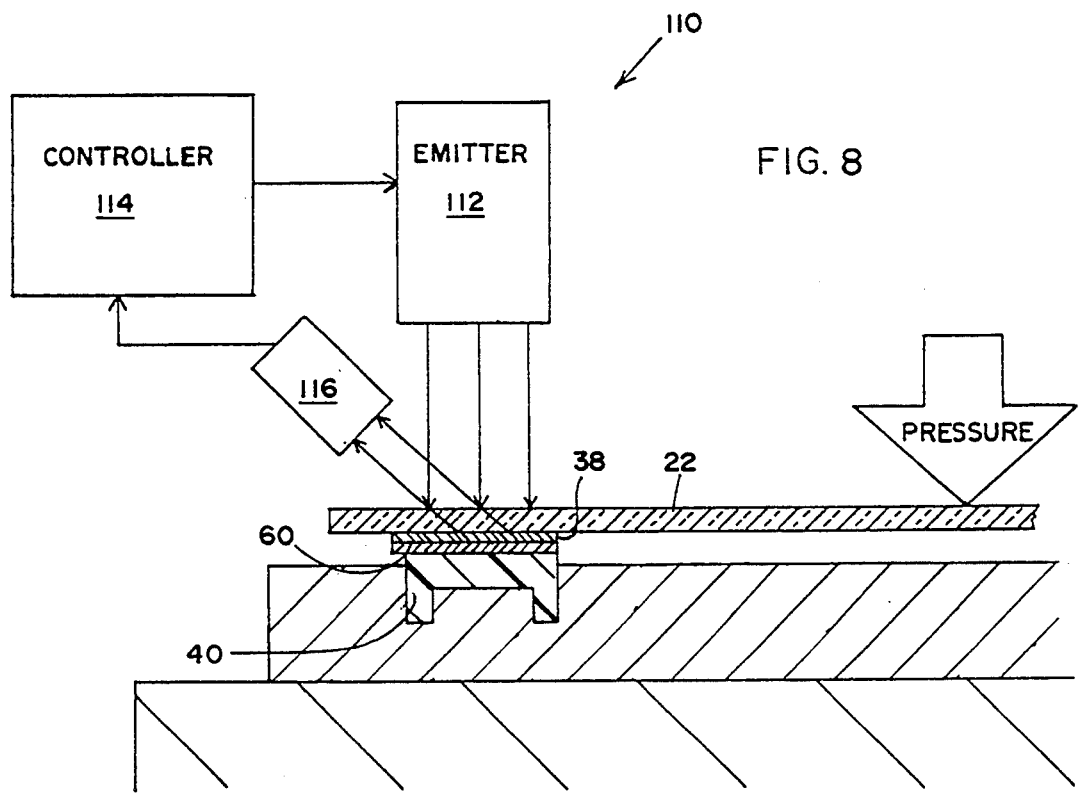
FIGS. 8 and 9 schematically illustrate heating devices which may be used in this invention.

Generally simultaneously with the extension of foot 76, heat energy source 80 is positioned by ram 82 (FIG. 4D) to a predetermined distance away from sheet 22. Source 80 may be moved using one or more rams similar to 82, or the like. It is preferred that source 80 be a controlled focused source of radiation (CFIR) 110, such as shown in FIG. 8. Controlled focused infrared source 110 includes one or more infrared emitter assemblies 112 such as Model 5305-104 produced by Radiant Energy Research, Inc. of Minneapolis, Minn. Emitter 112 may be positioned with respect to sheet 22 in a pattern conforming to that region of sheet 22 adapted to receive gasket 40 (FIG. 6). In the alternative, a single infrared emitter assembly 112 may be moved above sheet 22 in a pattern conforming to that of the gasket layout by a guided robotic arm or other mechanisms such as a cam-operated guide. Computer/process controller 114 preferably causes infrared emitter assembly 112 to emit infrared energy having a wavelength between $7.0 \times 10^3$ and $4.0 \times 10^4$ Angstroms into sheet 22 from a side opposite that containing primer 60 and frit layer 38 to heat the interface or frit layer 38 between the sheet and the gasket. A spectrophotometer 116, disposed above sheet 22 and coupled to computer/process controller 114, detects the energy reflected and radiated from sheet 22. Based upon the feedback from spectrophotometer 116, controller 114 adjusts the power of infrared energy emitted by assembly 112 such that most of the energy is absorbed by frit layer 38 in the area of primer 60 to raise the temperature to the desired level. Although CFIR 110 has been described for use in both preheating and heating after location with the gasket, it is contemplated that CFIR 110 will be most effective to heat frit layer 38 after panel 22 is located with respect to gasket 40.

Figure 9:
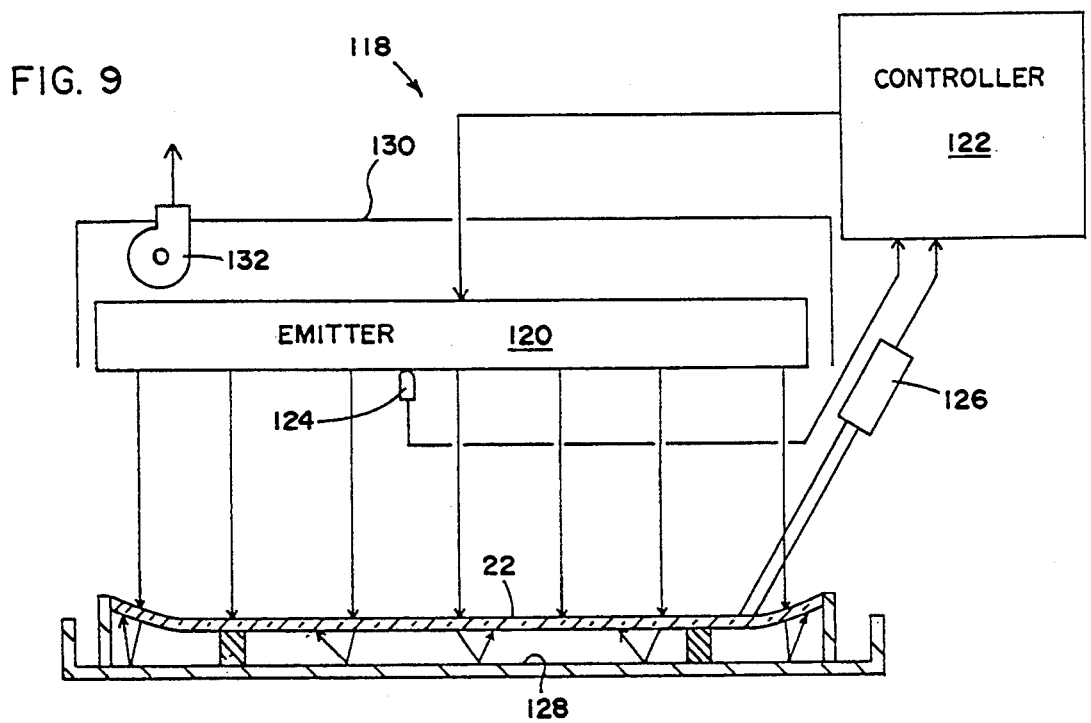

In an alternate embodiment, a controlled area source 118 of infrared radiation (CAIR, FIG. 9) is located at a predetermined distance above sheet 22. Controlled area infrared source 118 may include one or more infrared emitters 120 such as Model FB122425B3 made by Cassso-Solar Corp. of Pomona, N.Y. The energy of radiation generated by emitter 120, having a wavelength between the range of $2.7 \times 10^4$ and $4.0 \times 10^4$ Angstroma, is controlled by computer/process controller 122 based upon input from a thermocouple 124 attached to emitter 120, and a spectrophotometer 126 angularly disposed with respect to sheet 22. A reflector 128 may be disposed beneath sheet 22 to redirect energy back into sheet 22. The CAIR is better adapted to simultaneously heat an exposed area on sheet and may be used to preheat the panel, if desired. Contemplated in both of the heating options described above, but shown only in FIG. 9, is a plenum 130 and exhaust fan 132, cooperating to vent fumes driven off during the heating process.

Since the radiation produced by emitters 110, 118 may be introduced into sheet 22 from a side opposite that containing primer coating 60, it is preferred that sheet 22 have a high transmissivity to the wavelength of radiation selected. Emitters 110, 118 both produce infrared radiation having a wavelength greater than $7.0 \times 10^3$ Angstroma. The transmissivity of the radiation is greatly affected by the particular characteristics of sheet 22. For example, optically clear glass panels have a higher transmissivity (ratio of radiation transmitted through the panel to that of radiation incident upon the panel) for infrared radiation than clear non-glass panels because a certain amount of the radiation is absorbed by the atomic lattice comprising the non-glass sheet. Tinted or opaque panels may have a lower transmissivity since the pigments or coloration within the material may absorb a portion of the radiation. For materials having lower transmissivities, it is preferred to select wavelengths of radiation which promulgate better through the tinted or opaque materials, yet are absorbed at the contact boundary or frit layer between sheet 22 and primer coating 60, such as in the range of $5.0 \times 10^3$ and $4.0 \times 10^4$ Angstroms. In the preferred embodiment of this invention, sheets 22 are optically clear glass sheets and may be single sheet or laminated sheets, depending on the desired function in the vehicle.

In order to reduce problems associated with heating and cooling large expanses of glass or plastic panels, it is preferred that each of the above radiation sources direct its energy to a restricted portion of panel or sheet 22. For example, since it is desired to heat only that portion of sheet 22 adapted to engage gasket 40, CFIR 110 or CAIR 118 may be adapted so that the radiation is applied only to the peripheral margin or other location receiving the gasket. Alternatively, a single source may be moved around sheet 22 by a guided robotic arm, as mentioned above. Moreover, one or more emitters may be recessed within a tool patterned to coincide with the area of the panel to be heated. In an alternative to energy sources 110 and 118 described above, sheet 22, frit layer 38 and primer 60 may be heated using convection, conduction, induction, radiation, resistive and microwave energy heat sources.

In an alternate embodiment of the above method shown in FIG. 7, the forcing of sheet 22 against gasket 40 may be accomplished by creating a negative pressure or vacuum within a chamber 90 formed by the inside perimeter 92 of closed-loop gasket 40, upper surface 65 of fixture 62, and surface 24 of sheet 22. Suction lines, such as 94 extending through platen 72 and fixture 62, are coupled to a vacuum source (not shown) adapted to create a negative pressure ranging between one-half and five atmospheres ($-7$ and $-70$ psi). The vacuum created in chamber 90 draws sheet 22 toward fixture 62 and against gasket 40. Another method better adapted for use with gasket patterns which are not closed-loop is by creating a vacuum between suction cups (not shown) at the ends of vacuum lines 94 within cavity 90.

Although the above description has been made with reference to sheet 22 being moved with respect to gasket 40, it should be understood that gasket 40 may be moved as supported in a fixture with respect to sheet 22 in the bonding process. Moreover, the amount of pressure required to optimize the contact between panel 22 and gasket 40 is dependent upon several factors, including the total surface area to be bonded, the temperature, size and geometric shape of sheet 22, and the exact nature and temperature of the adhesive and the material forming gasket 40. For example, for a substantially flat glass sheet 4 millimeters thick, a surface area of approximately 1 square meter, and a PVC gasket having a 2.5 centimeter wide bonding surface extending substantially around the entire perimeter of the sheet in a closed loop, the pressure required to effect a secure bond is between about 0.5 and 3 atmospheres (7 to 45 psi).

In addition to the steps outlined above, it is preferred to preheat sheet 22 add gasket 40 before bonding the two together. In one embodiment, sheet 22 is primed in the desired areas and preheated to drive off any remaining carrier/solvents and raise the temperature of surface 24 and frit layer 38. A preferred method of heating sheet 22 is irradiating sheet 22 with infrared radiation produced by CAIR 118, described above and shown in FIG. 9. Once sheet 22 is preheated (100° F. to 350° F.), gasket 40 is bonded to sheet 22 by reheating the frit layer 38 between sheet 22 and gasket 40 to between 100° and 350° F. to activate primer 60. Preferably, heating the contact surface between sheet 22 and gasket 40 is accomplished by CFIR source 110 (FIG. 8) focused on frit layer 38 to heat bonding surface 50 and primer 60 from a side of sheet 22 opposite that of gasket 40, as described above. Sheet 22 is substantially transparent to the infrared radiation (less than $4.0 \times 10^4$ Angstroms) passing therethrough and impinging upon the contact surface between gasket 40 and sheet 22. Pressure is also applied, either prior to or simultaneously with the heating, in order to maximize the surface area of each component in contact with the other. After approximately three to thirty seconds of applying pressure and heat, both are removed and assembly 20 is allowed to cool, curing or hardening the bond between gasket 40 and sheet 22. Once assembly 20 is cooled, it may be moved on in the assembly process as finished goods.

Because the heating sources described above with reference to FIGS. 8 and 9 are adapted to heat sheet 22 and frit layer 38, gasket 40 is preferred to be heated using a separate heating source. Gasket 40 can also be heated by built-in heaters in the fixture. Gasket 40, made from PVC or similar polymeric material, may be quite stiff before being loaded into fixture 62. In order to make gasket 40 more flexible and promote adhesion, it is preferred that gasket 40 be preheated to raise the temperature level of gasket 40 to approximately 100° F. At that temperature, gasket 40 becomes substantially pliable and may readily be stretched if necessary to make appropriate curves or bends in the gasket layout.

Following the above steps, a substantially flat sheet of glass having a thickness of 4 millimeters, and a flat layer, was primed with A-1100-B and A-1167-B primer mixture. A gasket, such as shown in FIG. 2B, was preformed separate from sheet 22 using injection molding techniques in a 250 ton press using 200 tons of clamping pressure. The melt temperature of the gasket material was 380° F. and had a nine second cure time in the mold. While the gasket was being formed, the frit layer on the glass panel was preheated to approximately 300° F. After the gasket was formed and had cooled to approximately 100° F. it was removed from the mold and located in a fixture such that the bonding surface was exposed. The preheated panel was then located with respect to the gasket and pressed thereon using 14 psi of force maintained for approximately seven seconds. Simultaneously with the pressure, the frit layer was heated from a side opposite the gasket to activate the primer. Following the application of heat and pressure, the panel assembly was allowed to sit for less than one minute before being removed from the fixture.

Although in each of the above embodiments gasket has been described generally as being made from PVC, other materials may also be used, including reaction injection molded (RIM) urethane or thermoplastic elastomers such as thermoplastic rubber (TPR), thermoplastic olefin (TPO), and thermoplastic urethane (TPU). The preferred material, PVC, offers several advantages, including ease in handling, is readily available, inexpensive, and recyclable. Moreover, PVC material is substantially resistant to ultraviolet radiation and pliable in a variety of climatic conditions. A preferred PVC material is 48562 obtained from Vista Chemical Co. of Aberdine, Miss. Moreover, the gaskets may be mass produced using any one of the above materials separate to the bonding process.

Figure 10:
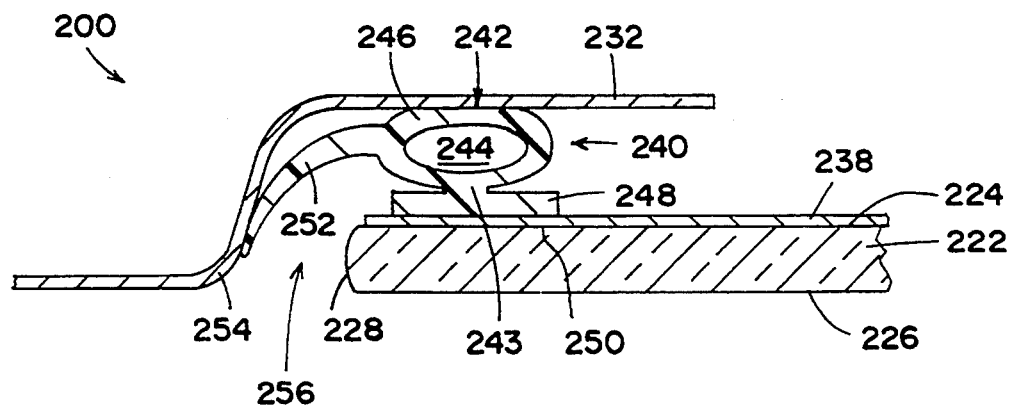
FIGS. 10 and 11 generally illustrate alternate embodiments of panel assemblies made in accordance with the method.
Figure 11:
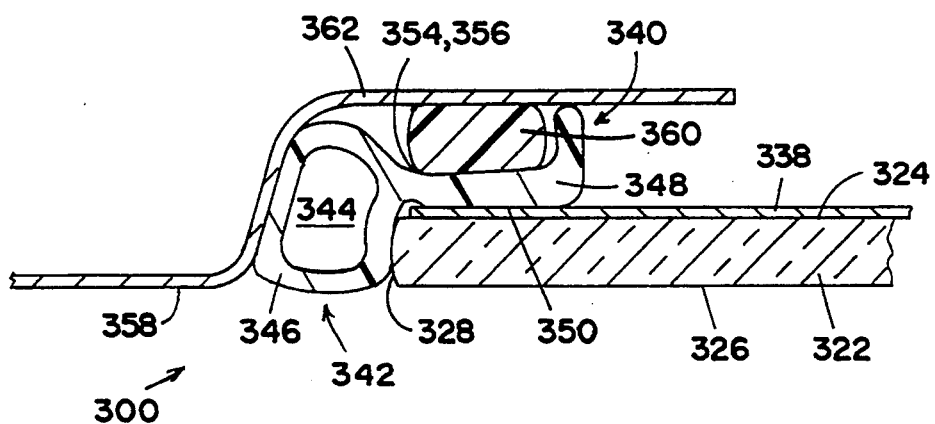

FIGS. 10 and 11 generally illustrate two additional embodiments of a panel assembly made in accordance with the method of this invention. FIG. 10 is a fragmentary section view of one embodiment 200 of panel assembly 20 shown in FIG. 1 and taken along lines XI—XI. Panel assembly 200 includes a panel or sheet 222 which may be tempered, laminated, or otherwise strengthened using conventional principles. Sheet 222 has two opposing surfaces 224, 226 joined at a peripheral edge 228. Surface 224 may include a ceramic or similar material frit layer 238 bonded thereto to conceal the mounting of panel assembly 200 in the opening. Fixed to frit layer 238 and/or surface 224, and extending around at least a portion of sheet 222 near peripheral edge 228 is a flexible, resilient, extruded gasket 240 adapted to locate and seal panel 222 with sheet metal pinch flange 232 forming in the opening. In this embodiment, panel or sheet 222 may be movable with respect to pinch flange 232.

Gasket 240 includes a tubular body 242 having a generally concentric inner chamber 244 formed by wall 246. Tubular body 242 is interconnected by an integral rib or web 243 to a securing flange 248 having a bonding surface 250 adapted to contact and bond with sheet 222 and/or frit layer 238. Also extending from tubular body 242 is a lip 252 adapted to engage the outer surface of sheet metal 254 and drape within opening 256 between sheet metal 254 and peripheral edge 228. This panel assembly 200, satisfying flush-mounted panel requirements for next generation vehicles, preferably has gasket 240 extruded from UV-stable PVC or similar material, as described above.

FIG. 11 generally illustrates in partial cross section one embodiment of a fixed panel assembly 300 made in accordance with the above method. Sheet 322, with or without a frit layer as described above, receives an extruded bulb seal 340 adhered to surface 324 near peripheral edge 328. Seal or gasket 340 includes a tubular body or bulb 342 having a gas filled chamber 344 defined by wall 346. Extending from bulb 342 generally normal to wall 346 is a securing flange 348 having a securing surface adapted to contact and be adhered to surface 324. An opposite side 354 of flange 348 includes a channel 356.

Gasket 340 is bonded to surface 324 of panel 322, as described above, with respect to the general method such that bulb 342 is located between peripheral edge 328 and sheet metal 358 on the vehicle exterior. The panel 322 and gasket 340 are bonded in the opening by a bead of adhesive 360 extruded into channel 356 and pressed against pinch flange 362. The resilient nature of bulb 342 seals the gap between the sheet metal and glass with a generally smooth transition, which results in reduced wind noise and dirt infiltration and provides an aesthetically pleasing appearance. Since a portion of gasket 340 is exposed in the panel opening, it is preferred that gasket 340 be made from UV-stable material such as PVC.

The invention has been described with respect to specific preferred embodiments thereof and many variations and modifications will become apparent to those skilled in the art. For example, the heat activated primer composition may be substituted by a chemically activated adhesive. This is particularly the case for panels made from materials other than glass such as acrylic or similar polymeric material. It is, therefore, the intention that the appended claims be interpreted as broadly as possible in view of the prior art to include all such variations and modifications.

The embodiments of the invention in which an exclusive property or privilege is claimed are defined as follows.

1. A method for manufacturing a panel assembly comprising:
   providing a sheet-like panel having at least one surface;
   supporting a preformed gasket in a predetermined pattern with a bonding surface arranged to face said panel portion;
   priming at least one of said panel surface and said bonding surface of said gasket by applying an adhesion promoting priming composition thereto;
   locating said panel on said preformed gasket following arrangement of said gasket in said predetermined pattern;
   forcing said panel against said gasket to form a contact boundary; and
   heating said contact boundary between said panel and said gasket to bond said gasket to said panel to form said panel assembly.

2. A method as recited in claim 1, further including heating said panel after priming to promote adhesion.

3. A method as recited in claim 2, further including heating said gasket prior to locating said panel thereon.

4. A method as recited in claim 1, further including:
   generating infrared energy;
   directing said infrared energy through said panel;
   monitoring said infrared energy being absorbed by said contact boundary; and
   controlling said infrared energy to maximize heat transfer to said contact boundary.

5. A method as recited in claim 4, wherein the step of directing said infrared energy includes focusing a controlled, infrared beam of radiation into said panel from a side opposite that receiving said gasket.

6. A method as recited in claim 4, wherein the step of directing said infrared energy includes selecting an optimum frequency of infrared radiation adapted to be transmitted through said panel without significant attenuation from a side opposite that receiving said gasket.

7. A method as recited in claim 1, further including placing said gasket in a predetermined pattern.

8. A method as recited in claim 1, further comprising the step of forming said gasket into a continuous closed-loop prior to locating said panel thereon.

9. A method as recited in claim 1, further including heating said gasket prior to locating said panel thereon.

10. A method as recited in claim 1, wherein the step of heating said contact boundary includes focusing radiation on said contact boundary from a side of said panel opposite said gasket.

11. A method as recited in claim 1, further including molding said gasket into said predetermined pattern.

12. A method as recited in claim 1, further including extruding said gasket prior to the step of supporting said gasket in a pattern.

13. A method as recited in claim 11, wherein said molding includes injection molding said gasket.

14. A method as recited in claim 11, wherein said molding includes pour molding said gasket.

15. A method as recited in claim 11, wherein said molding includes blow molding said gasket.

16. A method as recited in claim 13, wherein said injection molding includes reaction injection molding said gasket.

17. A product formed by the method as recited in claim 1.

18. A product formed according to the method as recited in claim 2.

19. A product formed according to the method as recited in claim 9.

20. A method for manufacturing a panel assembly comprising the steps of:
   locating a preformed gasket in a retaining fixture, at least a portion of said gasket having a positive relief with respect to said fixture;
   preparing at least one surface of a panel having a frit layer adapted to engage said gasket including priming said at least one surface with an adhesion promoting primer composition; and
   bonding said gasket to said prepared surface of said panel by pressing said panel and gasket into intimate contact with each other to form said panel assembly.

21. A method as recited in claim 20, further including heating said preformed gasket.

22. A method as recited in claim 21, including heating said gasket to a temperature to promote bonding to said panel.

23. A method as recited in claim 21, including heating said preformed gasket to a temperature sufficient to make said gasket flexible for locating in said fixture.

24. A method as recited in claim 20, further including heating said frit layer.

25. A method as recited in claim 24, wherein the step of heating said frit layer occurs prior to the step of bonding.

26. A method as recited in claim 24, further including heating said frit layer from a side of said panel containing said frit layer.

27. A method as recited in claim 25, further including heating said frit layer from a side of said panel opposite said frit layer.

28. A method as recited in claim 24, wherein the step of heating said frit layer occurs during the step of bonding.

29. The method as recited in claim 28, further including heating said frit layer substantially simultaneously with the step of pressuring said panel into contact with said gasket.

30. The method as recited in claim 28, further including heating said frit layer after pressuring said panel into contact with said gasket.

31. A method as recited in claim 24, wherein the step of heating said frit layer occurs after the step of bonding.

32. A method as recited in claim 24, wherein the step of heating said frit layer includes irradiating said frit layer with infrared radiation.

33. A method as recited in claim 24, wherein the step of heating said frit layer includes using convection heating.

34. A method as recited in claim 24, wherein the step of heating said frit layer includes using conduction heating.

35. A method as recited in claim 24, wherein the step of heating said frit layer includes using induction heating.

36. A method as recited in claim 30, wherein the step of heating said frit layer includes using microwave energy.

37. A method as recited in claim 30, wherein the step of heating said frit layer includes using resistive heating.

38. A method as recited in claim 20, further including molding said preformed gasket.

39. A method as recited in claim 20, wherein said molding includes injection molding said gasket.

40. A method as recited in claim 20, wherein said molding includes pour molding said gasket.

41. A method as recited in claim 20, wherein said molding includes below molding said gasket.

42. A method as recited in claim 20, wherein said molding includes casting said gasket.

43. A method as recited in claim 20, further including extruding said preformed gasket.

44. A panel assembly, comprising:

a sheet-like panel having first and second surfaces terminating in a peripheral edge;

a primer coating applied to at least one of said surfaces;

a gasket, formed separately from said panel, bonded to said at least one surface having said primer coating by applying heat to a contact boundary between said panel and said gasket and forcing said panel against said gasket.

45. A panel assembly as recited in claim 44, wherein said gasket includes:

a tubular body; and at least one securing flange extending from said tubular body to define a bonding surface engaged with said at least one surface.

46. A panel assembly as recited in claim 44, wherein said gasket includes a lip seal extending beyond said peripheral edge of said panel.

47. A panel assembly as recited in claim 45, wherein said gasket includes a lip seal extending beyond said peripheral edge of said panel.

48. A panel assembly as recited in claim 45, wherein said tubular body is disposed outboard of said peripheral edge of said panel.

49. A panel assembly for use in a vehicle opening, comprising:

a sheet-like panel of size and geometry adapted to fit in the vehicle opening, said panel having a first and second surfaces terminating in a peripheral edge;

heat activated bonding means on a portion of said first panel surface proximate said peripheral edge; and a polymeric gasket formed separately from said sheet-like panel and having a bonding surface engaging said heat activated bonding means on said portion of said first panel surface.

50. A panel assembly as recited in claim 49, wherein said heat activated bonding means is a primer composition on said portion of said first panel surface.

51. A panel assembly as recited in claim 49, wherein said gasket is formed from polyvinyl chloride.

52. A panel assembly as recited in claim 49, wherein said sheet-like panel is a window.

* * * * *

UNITED STATES PATENT AND TRADEMARK OFFICE
CERTIFICATE OF CORRECTION

PATENT NO. : 5,440,849
DATED : August 15, 1995
INVENTOR : Raj K. Agrawal et al.

It is certified that error appears in the above-identified patent and that said Letters Patent is hereby corrected as shown below:

In the abstract, line 2;
    "adjusted" should be --adapted.

Column 3, line 38;
    After "used" insert --in--.

Column 5, line 66;
    "cubular" should be --tubular--.

Column 5, line 67;
    "Is made" should be --is made--.

Column 6, line 67;
    After "80" insert --.--.

Column 7, line 1;
    "platen 52" should be --platen 72--.

Column 8, lines 1 & 2;
    "Angstroma" should be --Angstroms--.

Column 8, line 19;
    "Angstroma" should be --Angstroms--.

UNITED STATES PATENT AND TRADEMARK OFFICE
CERTIFICATE OF CORRECTION

PATENT NO.  : 5,440,849
DATED       : August 15, 1995
INVENTOR    : Raj K. Agrawal et al.

It is certified that error appears in the above-identified patent and that said Letters Patent is hereby corrected as shown below:

Column 9, line 21;
  "22 add" should be --22 and--.

Column 13, line 38, calim 41;
  "below" should be --blow--.

Signed and Sealed this

Seventh Day of May, 1996

Attest:

Attesting Officer

BRUCE LEHMAN

Commissioner of Patents and Trademarks